Figure 1:
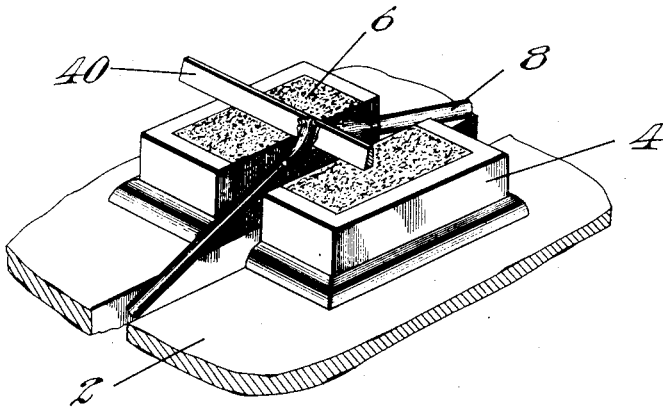

A. R. BRADEN.
ELECTRIC HEATING APPARATUS.
APPLICATION FILED JULY 16, 1915.

1,210,591.

Patented Jan. 2, 1917.

INVENTOR
Albert R. Braden

UNITED STATES PATENT OFFICE.

ALBERT R. BRADEN, OF BEVERLY, MASSACHUSETTS, ASSIGNOR TO UNITED SHOE MACHINERY COMPANY, OF PATERSON, NEW JERSEY, A CORPORATION OF NEW JERSEY.

ELECTRIC HEATING APPARATUS.

1,210,591.  Specification of Letters Patent.  Patented Jan. 2, 1917.

Application filed July 16, 1915. Serial No. 40,260.

*To all whom it may concern:*

Be it known that I, ALBERT R. BRADEN, a citizen of the United States, residing at Beverly, in the county of Essex and State of Massachusetts, have invented certain Improvements in Electric Heating Apparatus, of which the following description, in connection with the accompanying drawings, is a specification, like reference characters on the drawings indicating like parts in the several figures.

This invention relates to electric heating apparatus and is herein shown as embodied in apparatus intended for heating metal strips preparatory to a bending or shaping operation, although it is in no sense limited to such employment.

In the manufacture of dies for clicking presses, as disclosed for example in United States Letters Patent No. 922,926, granted on an application of J. M. Lynch, it is necessary to bend strips of steel to conform with the greatest accuracy to the contour of a templet giving the outline desired in the blanks to be cut by the die. Preparatory to the shaping operation the steel strips are heated at the points where the bending is to occur. The manipulation of the strips required in accurately bending them to the desired contour is greatly facilitated by a rapid and local heating as under these circumstances the strips may be bent by hand and the necessity is avoided of using tongs.

One object of the present invention is to provide apparatus for heating strip steel material for the purposes discussed.

To this end an important feature of the invention consists in a work supporting member comprising highly refractory material so shaped as to support the strip and permit an electric arc to be directed at the point to be heated. An advantage of such construction is that the heating effect is localized at the point desired while the remainder of the strip is shielded somewhat from the action of the arc.

Other features of the invention relate to improved mechanism for controlling the movement of the carbons between which the arc is formed. As herein shown a pair of angularly movable guideways are provided for the carbon carriers and these guideways are controlled in their position by adjustable means which permit the height of the carbons and the angle between them to be varied to suit the requirements of the work in hand. Manually controlled means are also provided for advancing the carbons when the arc is to be formed and for retracting the carbons when the material has been sufficiently heated.

These and other features of the invention will be best understood and appreciated from the following description of a preferred embodiment thereof selected for purposes of illustration and shown in the accompanying drawings, in which,—

Figure 2:
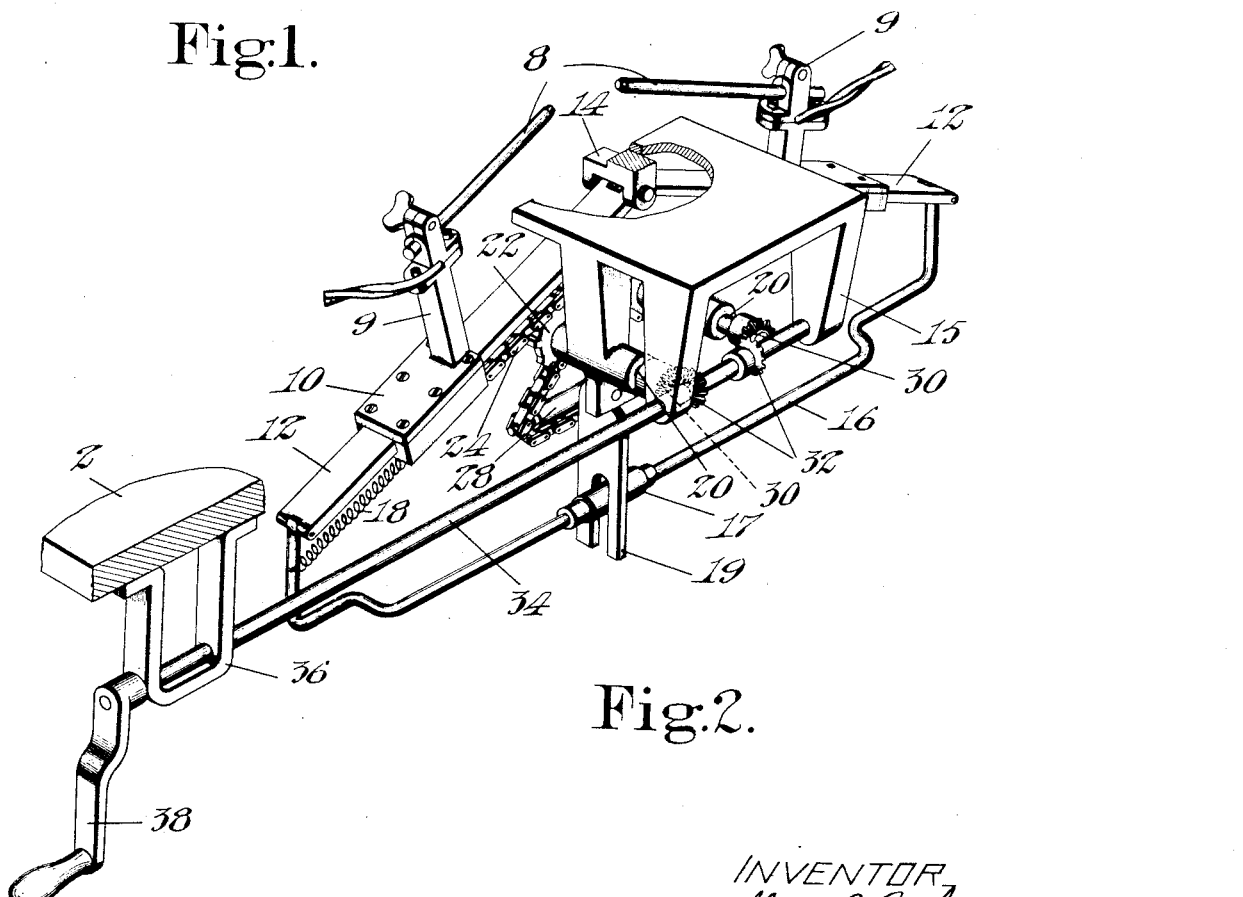

Figure 1 is a view in perspective of the work supporting portions of the apparatus, and Fig. 2 is a view in perspective of the carbon carriers and the associated mechanism.

The apparatus is mounted upon a bench 2 with its work supporting portions above the bench and the mechanism for operating the carbons below the bench.

As shown in Fig. 1 the work supporting portion of the apparatus comprises a box 4 of cast iron or other suitable material slotted through the center and having a filling of a highly refractory material. In practice, it has been found that carborundum or a mixture of carborundum and fire clay may be utilized with good advantage for this purpose. The term carborundum is used hereinafter for the sake of brevity and is intended to include any composition or mixture of which carborundum is the predominating element. This material is molded within the box 4 into two blocks of which the upper surfaces are substantially horizontal and flush with the edges of the box while the inner surfaces are substantially vertical and flush with the walls of the slot in the surface of the bench 2.

Each of the carbons 8 is mounted in a post clamp 9 projecting upwardly from a carriage 10 arranged to slide upon a guideway bar 12. The guideway bars 12 are hinged together at their inner ends in a U-shaped member 14 located beneath the bench and projecting downwardly from a frame 15 which is secured to the under side of the bench. The guideway bars 12 converge upwardly toward the hinged member 14 and are adjustably maintained in position by an extensible bar 16 which extends between their outer ends and is provided with a sleeve 17 having a right and left hand thread. A stationary forked plate 19 projects downwardly from the frame 15 and holds the rod 16 against lateral movement thus steadying the guideway bars 12.

Each of the carriers 10 is connected at its outer end to a tension spring 18 which tends normally to move the carriers apart and so break the arc between the carbons. The carriers are moved toward each other to start an arc between the carbons by mechanism under control of the operator. To this end the frame 15 is provided with journals for a pair of sprocket shafts 20 each having at its rear end a sprocket wheel 22. A sprocket chain 24, connected at either end to one of the carriers 10, extends over and about the inner side of each of the sprocket wheels 22. In the loop or bite of the chain is provided a counter-weight 28 which prevents the loose portion of the sprocket chain from becoming twisted.

Each sprocket shaft 20 carries at its outer end a beveled gear 30 which is arranged to mesh with one of a pair of oppositely disposed beveled gears 32 upon a shaft 34 which is journaled at its inner end in the frame 15 and at its outer end in a U-shaped bearing member 36 located at the edge of the bench. Upon the outer end of the shaft 34 is provided a crank 38 by which the operator may rotate the shaft 34 to advance the carbons in opposition to springs 18.

In using the apparatus herein disclosed for the purpose of heating a metal strip the operator turns the crank 38 so as to cause the sprocket chain 24 to draw the carriers upwardly and inwardly along the guideway bars 12 until the ends of the carbons 8 are brought sufficiently close together to permit the starting of an electric arc between them. The crank is then permitted to rotate reversely until the ends of the carbons are somewhat separated, the arc continuing to exist between them, however. The strip 40 is then placed upon the surface of the box 4 with the point which it is desired to heat bridging the gap in the carborundum filling. This condition is shown in Fig. 1 of the drawings from which it will be noted that the gap in the filling serves to confine the electric arc and direct it to the portion of the strip 40 which bridges the gap and at the same time has the effect of shielding the remainder of the strip from the intense heat of the arc. The metal strip is very rapidly heated sufficiently to permit it to be easily bent while its ends remain sufficiently cool to be grasped by the operator. This, as already stated, greatly facilitates an accurate bending of the strip and the process of preparing the bent strip with the templet showing the desired outline. As soon as the operator releases the crank 38 to take up the heated strip the carriers are separated and the arc broken thus relieving the operator of giving any attention to the apparatus until he is ready to heat a new portion of the strip.

Having thus described my invention, what I claim as new and desire to secure by Letters Patent of the United States is:

1. Electric heating apparatus comprising a support having a slot, a block of carborundum disposed adjacent to each side of the slot, said blocks having their upper surfaces disposed in a common plane for supporting the work, and carbons relatively movable in the slot and between the blocks of carborundum.

2. Electric heating apparatus comprising hinged guideways, a carbon carrier movable along each guideway, and an extensible bar connecting the guideways.

3. Electric heating apparatus comprising a work support, a pair of guideway bars hinged at their inner ends beneath the support, and an expansible bar extending between their outer ends.

4. Electric heating apparatus comprising a bench having a work support, carbons movable toward and from a point adjacent to the support, mechanism beneath the support for moving the carbons, and controlling means for said mechanism located at the edge of the bench.

5. Electric heating apparatus comprising a guideway, a carrier movable along the guideway, a sprocket wheel mounted adjacent to the guideway, a sprocket chain connected to the carrier and passing over the sprocket wheel, and manually operated means for turning the sprocket wheel to advance the carrier on its guideway.

6. Electric heating apparatus comprising a pair of converging guideways, a carbon carrier on each guideway, springs tending to separate the carriers, sprocket and chain mechanism connected to both carriers, and a crank for operating said mechanism for moving the carriers toward each other.

In testimony whereof I have signed my name to this specification.

ALBERT R. BRADEN.